United States Patent [19]

Warwick

[11] Patent Number: 4,470,577
[45] Date of Patent: Sep. 11, 1984

[54] CORROSION RESISTANT BLEEDER SCREW ARRANGEMENT

[75] Inventor: Edward H. Warwick, Englewood, Ohio

[73] Assignee: General Motors Corporation, Detroit, Mich.

[21] Appl. No.: 362,404

[22] Filed: Mar. 26, 1982

[51] Int. Cl.³ .............................................. F16K 31/44
[52] U.S. Cl. .................................. 251/217; 251/216; 251/351; 188/352
[58] Field of Search ............... 251/216, 217, 351, 353; 188/352

[56] References Cited

U.S. PATENT DOCUMENTS

| | | | |
|---|---|---|---|
| 3,578,285 | 5/1971 | Carlton | 251/218 |
| 3,601,358 | 8/1971 | Cruse | 251/351 |
| 4,307,748 | 12/1981 | Mathias | 251/351 |

FOREIGN PATENT DOCUMENTS 2201640 7/1973 Fed. Rep. of Germany ...... 251/351

Primary Examiner—A. Michael Chambers
Attorney, Agent, or Firm—D. D. McGraw

[57] ABSTRACT

A bleeder arrangement for a hydraulic system of the type used in vehicle brakes. It includes a bleeder screw and bleeder passage construction which completely protects the bleeder screw threads from any exterior corrosive agents. The screw body is arranged to radially clear the housing in which it is installed so that corrosive action will not tend to seize the screw body to the housing. A seal arrangement also protects the valve portion of the bleeder screw from corrosive action as well as preventing fluid spillage during the bleeding operation.

3 Claims, 3 Drawing Figures

CORROSION RESISTANT BLEEDER SCREW ARRANGEMENT

The invention relates to bleeder screws of the type used in drum brake wheel cylinders, disc brake actuating cylinders and other hydraulic cylinders. The arrangement embodying the invention is particularly useful in any environment in which a bleeder screw may be exposed to exterior corrosion agents for an extended period of time between bleeding operations. The invention is illustrated in a drum brake assembly. The bleeder screw is installed in a bleeder passage so that the screw threads are on the fluid side of the bleeder screw seat, and the seat is sealed from the outside environment, completely protecting both the seat and the threads from corrosion. It is well known that corrosion of bleeder screws can commonly occur due to the rather harsh environment in which they operate. For example, salt is commonly used on roadways to control snow and ice, and can contribute to corrosion of threaded members. By use of the invention, the bleeder screw is protected from the corrosive environments so that it is readily operable for bleeding purposes even though such bleeding operations may take place at spaced timed intervals covering several months or even years.

IN THE DRAWING

Figure 1:
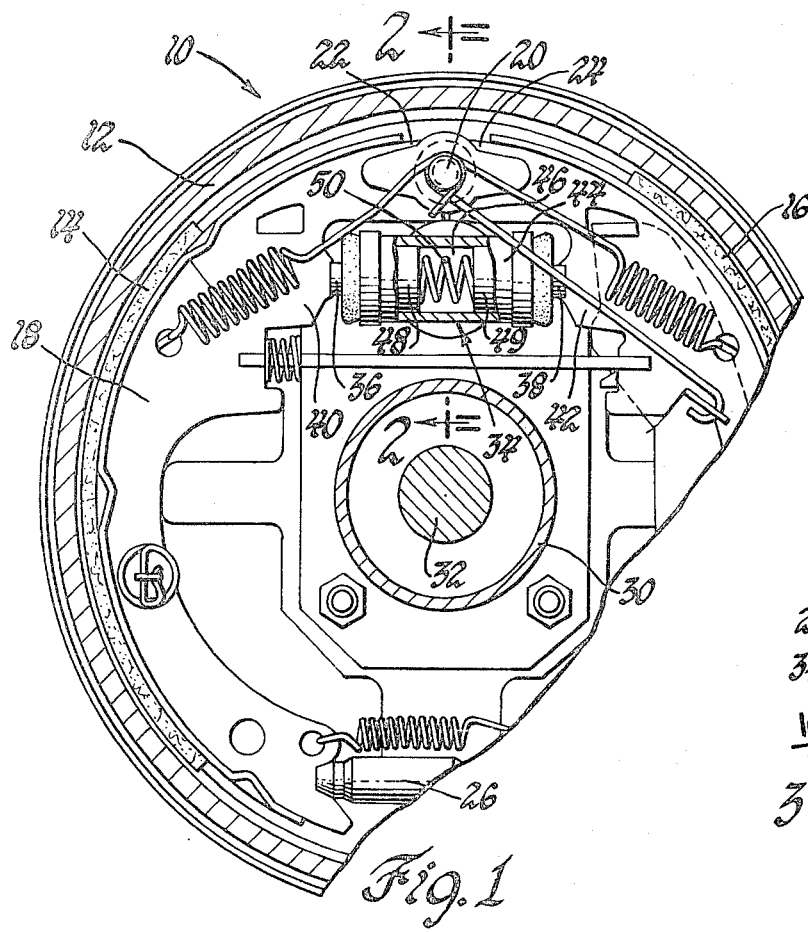
FIG. 1 is an elevation view of a brake assembly embodying the invention, with parts broken away and in section.
Figure 2:
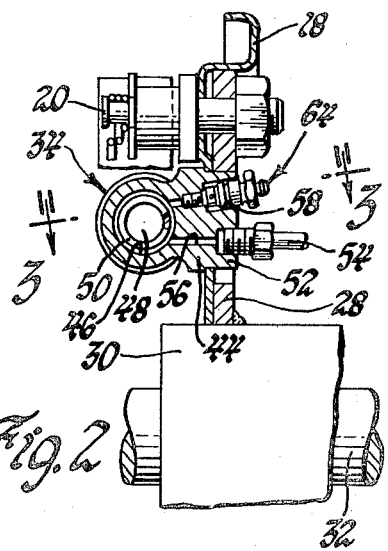
FIG. 2 is a cross-section view taken in the direction of arrows 2—2 of FIG. 1, with parts broken away and more particularly illustrating the bleeder arrangement embodying the invention.

The brake assembly 10 is illustrated as a drum brake assembly. It is to be understood, however, that the bleeder arrangement can be used in any suitable hydraulic member requiring occasional bleeding and subject to exterior corrosive factors. The brake assembly 10 includes drum 12, primary brake shoe 14, secondary brake shoe 16, backing plate 18 on which the shoes are suitably mounted and retained, anchor pin 20 normally engaged by the adjacent ends 22 and 24 of the shoes 14 and 16, and adjusting screw 26 between the other ends of the shoes 14 and 16 and arranged to be adjusted in a suitable manner known in the art. A mounting plate 28 is illustrated as being connected to an axle housing 30 through which a vehicle axle 32 rotatably extends. The axle housing and the mounting plate are therefore substantially fixed parts of the vehicle. Braking torque is transmitted from the brake assembly 10 through the anchor pin 20, the mounting plate 28 and the axle housing 30 to other portions of the vehicle. A wheel cylinder assembly 34 is illustrated as having wheel cylinder pins 36 and 38 extending from opposite ends thereof and engaging suitable portions of the webs 40 and 42 of shoes 14 and 16. As is well known in the brake art, suitable pistons 48 and 49 are reciprocably received within the housing 44 of the wheel cylinder assembly 34 so that a pressure chamber 46 is provided. A piston spring 50 is contained within chamber 46 and acts on the inner ends of the pistons to continually urge the pistons, and therefore pins 36 and 38, toward the shoe webs 40 and 42, also as is well known in the art. The wheel cylinder assembly 34 is suitably secured in place on the backing plate 18 so that it is held in the desired position in the brake assembly 10. The housing 44 has a boss 52 extending through the backing plate 18 and a suitable opening in the mounting plate 28 to provide ready access for the connection of the hydraulic brake line 54 to the inlet passage 56 leading to the pressure chamber 46 of the wheel cylinder assembly. A bleeder passage 58 is provided in housing 44 and extends through boss 52 so that the outlet end 60 of the bleeder passage is accessible for bleeding purposes when necessary. The inner end 62 of the bleeder passage opens into an upper portion of pressure chamber 46 so that air which may be trapped in the chamber 46 can be removed by bleeding the wheel cylinder, as is well known in the art.

Figure 3:
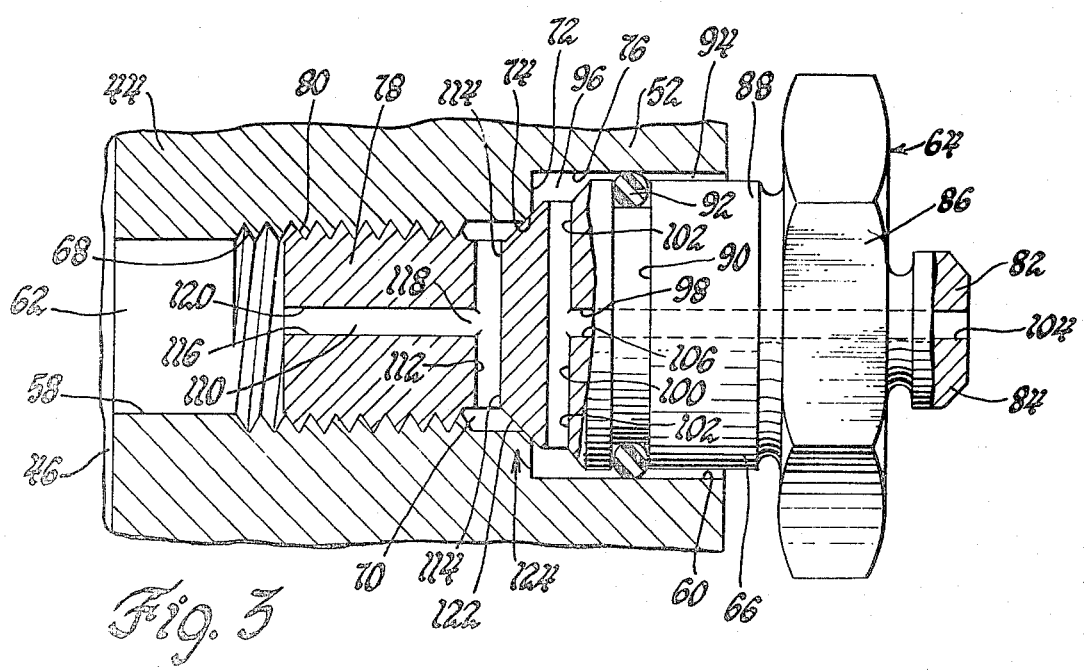
FIG. 3 is a fragmentary enlarged cross-section view of the bleeder arrangement of FIG. 2, illustrating the invention in greater detail.

The bleeder assembly 64 has a bleeder screw body 66 installed in the bleeder passage 58, as shown in detail in FIG. 3. An inner portion of the bleeder passage 58 is provided with internal screw threads 68. At the outer end of the screw threaded portion of the passage a diametrically enlarged chamber 70 is provided which is separated from the still larger diameter outlet end 60 of passage 58 by a shoulder 72. The radially inner edge of shoulder 72 is formed to define a bleeder valve seat 74. The wall section 76 defining the outer portion of passage 58, axially positioned between shoulder 72 and outlet end 60, is cylindrically formed.

The bleeder screw body 66 has an inner end section 78 provided with external screw threads 80 which are threaded into the internal screw threads 68 to provide a mating connection means between the bleeder 64 and the wheel cylinder housing 44. The outer end section 82 of the bleeder screw body 66 is formed to provide a nipple 84 adjacent to but axially spaced from the screw head 86. Head 86 is illustrated as being hexagonally formed to accept standard wrenches. The bleeder screw body 66 has a center portion 88 located substantially within the wall section 76 of passage 58 but radially inwardly spaced relative to that wall. Center portion 88 has an outer peripheral groove 90 formed therein and receiving an O-ring seal 92 which sealingly engages the wall section 76 of passage 58. Seal 92 prevents any exterior corrosive agents from passing through the radial clearance space 94 defined by the wall section 76 and the center portion 88 of the screw body. Inwardly of groove 90 the center portion 88 of the screw body is reduced in diameter to define, together with wall section 76 and shoulder 72, an annular chamber 96. This chamber is separated from chamber 70 by the valve seat 74. An outer vent passage 98 is formed through the screw body center section 88 and outer end 82. Passage 98 is formed by a cross-passage section 100, the outer ends 102 of which open into chamber 96, and an axially extending passage section 104. The inner end 106 of passage section 104 intersects and communicates with the cross passage 100, and the outer end opens axially through the nipple 84.

An inner vent passage 110 is formed in the inner end 78 of the bleeder screw body 66 and includes a cross passage section 112 having its ends 114 opening into chamber 70. The inner vent passage 110 also includes an axial passage section 116 having one end 118 intersecting and communicating with the cross passage section 112 and the other end 120 opening into the inner end 62 of bleeder passage 58, and therefore opening into the pressure chamber 46. A beveled portion 122 of the bleeder screw body 66 positioned between the screw body inner end 78 and the screw body central portion 88 is also axially positioned between the cross passage sections 100 and 112 and therefore separates the inner vent passage 110 from the outer vent passage 98. The beveled portion 122 provides a valve area which is engageable with valve seat 74 and cooperates therewith to define a valve 124.

In the normally closed position with the bleeder assembly installed, as illustrated in the drawing, the bleeder screw body 66 has been inserted into bleeder passage 58 and threaded tightly therein until the valve area formed by beveled section 122 seats on valve seat 74, effectively closing the bleeder passage 58 so that the bleeder passage inner end 62 is not fluid connected with its outer end 60. With valve 124 so closed, the inner vent passage 110 is closed from communication with the outer vent passage 98. Seal 92 is in sealing engagement with the bleeder passage wall section 76 so that the radial clearance space 94 is sealed at that point. Therefore the valve seat 74 and the screw threads 68 and 80 are protected from any exterior corrosive material. While the outer vent passage 98 is open to the exterior through the nipple 84, the length of the passage is such that substantial protection is provided against corrosive action with regard to the components of valve 124. With that valve closed, absolute protection is provided to the screw threads 68 and 80. With the screw body center portion 88 being radially spaced inwardly relative to the housing wall section 76, corrosive seizure between the screw body 66 and the housing 84 does not occur, and does not tend to lock the screw body to the housing at this point.

When bleeding of the brake circuit in which the wheel cylinder assembly 34 is connected must be accomplished, the technician will normally attach a small bleeder hose over the nipple 84 so that the brake fluid which is bled out of the pressure chamber 46 may be received in a suitable container for disposal. A tool is then used on the screw head 86 to rotate the screw body 66 so as to screw it slightly outwardly of bleeder passage 58 to open valve 124. As pressure is applied in the brake circuit, and therefore to pressure chamber 46, fluid flow, including air trapped in the chamber, occurs from the chamber out through the bleeder 64. This flow goes through the inner vent passage 110 into chamber 70, through the open valve 124 into chamber 96, and through the outer vent passage 98 to the hose connected to nipple 84. The seal 92 effectively prevents any hydraulic brake fluid spillage out of the outlet end 60 of bleeder passage 58 during this operation. When the air has been bled out of chamber 46, hydraulic brake fluid will flow out of the inner and outer vent passages, signifying that the bleeding operation is complete. At this point the technician tightens the bleeder screw body so that the valve 124 is again closed. Pressure in the brake circuit is then released. The bleeder hose connected to nipple 84 may then be removed and the bleeding operation is completed. By employing the invention, the screw threads 68 and 80 are totally protected from exterior corrosive action by the closure of valve 124 and the valve is substantially protected from such corrosive agents by the seal 92. The entire screw body is prevented from corrosive seizure to the body housing by providing sufficient radial clearance 94 in the area where the screw body and the housing are exposed to corrosive action.

The embodiments of the invention in which an exclusive property or privilege is claimed are defined as follows:

1. A bleeder arrangement comprising:
    a housing having a chamber therein requiring occasional bleeding, and a bleeder passage for said chamber formed to provide a valve seat recessed therein;
    a bleeder screw body having an inner vent passage and an outer vent passage discontinuous from said inner vent passage, a valve area axially separating said vent passages and cooperating with said valve seat to define a valve providing the only fluid connection between said vent passages, and mating connection means formed in said bleeder passage axially between said valve seat and said chamber and on the portion of said body through which said inner vent passage passes, said mating connection means being adjustable to open and close said valve as required and having the characteristic of corrodability when exposed to exterior corrosive agents, said connection means being protected from corrosion caused by exterior corrosive agents when said valve is closed.

2. A bleeder arrangement comprising:
    a housing having a chamber therein requiring occasional bleeding, a bleeder passage for said chamber formed to provide a valve seat recessed therein and internal threads between said valve seat and said chamber;
    a bleeder screw body having an inner vent passage and an outer vent passage discontinuous from said inner vent passage, a valve area axially separating said vent passages and cooperating with said valve seat to define a valve providing the only fluid connection between said vent passages, external threads formed on the portion of said body through which said inner vent passage passes and threaded into said internal threads to open and close said valve as required, said threads being protected from exterior corrosion agents by closure of said valve when said valve is closed.

3. A bleeder arrangement comprising:
    a housing having a chamber therein requiring occasional bleeding, a bleeder passage for said chamber formed to provide a valve seat recessed therein and internal threads between said valve seat and said chamber;
    a bleeder screw body having an inner portion with an inner vent passage and an outer portion with an outer vent passage discontinuous from said inner vent passage, a valve area axially separating said vent passages and cooperating with said valve seat to define a valve providing the only fluid connection between said vent passages, external threads formed on said body inner portion and threaded into said internal threads to open and close said valve as required, said threads being protected from exterior corrosion agents when said valve is closed;
    said bleeder passage having a diametrically enlarged outer portion axially outward of said valve seat through which said body outer portion is received, said body outer portion being sufficiently smaller in diameter than said bleeder passage outer portion to establish an annular clearance space therebetween, and a seal in said bleeder passage diametrically enlarged outer portion radially between and sealingly engaging said body outer portion and the wall of said bleeder passage outer portion, said seal also being axially spaced from said valve area and said valve seat to continuously protect said valve from exterior corrosion agents which may enter through said annular clearance, said seal and annular clearance between said body outer portion and said bleeder passage outer portion inhibiting corrosion-caused seizure of said body to said housing.

* * * * *